(12) United States Patent
Shimizu et al.

(10) Patent No.: US 10,843,398 B2
(45) Date of Patent: Nov. 24, 2020

(54) LIQUID BLOW MOLDING APPARATUS

(71) Applicant: DISCMA AG, Hunenberg (CH)

(72) Inventors: Kazuhiko Shimizu, Kanagawa (JP); Kenichi Suyama, Kanagawa (JP)

(73) Assignee: Discma AG, Zürich (CH)

( * ) Notice: Subject to any disclaimer, the term of this patent is extended or adjusted under 35 U.S.C. 154(b) by 131 days.

(21) Appl. No.: 15/562,335

(22) PCT Filed: Feb. 16, 2016

(86) PCT No.: PCT/JP2016/000789
§ 371 (c)(1),
(2) Date: Sep. 27, 2017

(87) PCT Pub. No.: WO2016/157686
PCT Pub. Date: Oct. 6, 2016

(65) Prior Publication Data
US 2018/0354185 A1 Dec. 13, 2018

(30) Foreign Application Priority Data
Mar. 31, 2015 (JP) .................... 2015-072148

(51) Int. Cl.
*B29C 49/12* (2006.01)
*B29C 49/78* (2006.01)
(Continued)

(52) U.S. Cl.
CPC .............. *B29C 49/12* (2013.01); *B29C 49/28* (2013.01); *B29C 49/46* (2013.01); *B29C 49/78* (2013.01); *B29C 49/783* (2013.01); *B29C 49/06* (2013.01); *B29C 49/4289* (2013.01); *B29C 49/58* (2013.01); *B29C 2049/465* (2013.01); *B29C 2049/4664* (2013.01); *B29K 2623/12* (2013.01); *B29K 2667/003* (2013.01); *B29L 2031/7158* (2013.01)

(58) Field of Classification Search
None
See application file for complete search history.

(56) References Cited

U.S. PATENT DOCUMENTS 9,610,744 B2 * 4/2017 Sato ....................... B29C 49/12
2009/0174124 A1 7/2009 Maeda et al.
(Continued)

FOREIGN PATENT DOCUMENTS

WO 2007/120807 A2 10/2007
WO 2013/132287 A2 9/2013

*Primary Examiner* — Peter L Vajda
*Assistant Examiner* — Adrianna N Konves
(74) *Attorney, Agent, or Firm* — Eric J. Sosenko; Jonathan P. O'Brien; Honigman LLP

(57) ABSTRACT

A liquid blow molding device for liquid blow molding a resin preform into a container having a predetermined shape. The liquid blow molding device includes a mold in which the preform is disposed; a stretch rod that axially stretches the preform disposed in the mold (; and a pressurized liquid supply that supplies a pressurized liquid to the preform. The liquid blow molding device operates such that the amount of the liquid supplied from the pressurized liquid supply to the inside of the preform before completing the stretching of the preform by the stretch rod (22) is 50% or less of the amount of the liquid to be filled in the container after the completion of the liquid blow molding.

11 Claims, 3 Drawing Sheets

(51) Int. Cl.
  *B29C 49/28*  (2006.01)
  *B29C 49/46*  (2006.01)
  *B29C 49/06*  (2006.01)
  *B29C 49/58*  (2006.01)
  *B29C 49/42*  (2006.01)
  *B29K 623/00*  (2006.01)
  *B29K 667/00*  (2006.01)
  *B29L 31/00*  (2006.01)

(56) References Cited

U.S. PATENT DOCUMENTS

| | | | |
|---|---|---|---|
| 2009/0317576 A1* | 12/2009 | Duranel | B29C 49/0005 428/36.92 |
| 2011/0037204 A1 | 2/2011 | Maeda et al. | |
| 2014/0305081 A1 | 10/2014 | Chauvin et al. | |
| 2014/0356475 A1 | 12/2014 | Sato et al. | |
| 2014/0367895 A1 | 12/2014 | Sato et al. | |
| 2015/0246475 A1 | 9/2015 | Suyama et al. | |
| 2015/0328824 A1* | 11/2015 | Morikami | B29C 49/12 425/524 |

* cited by examiner

LIQUID BLOW MOLDING APPARATUS

TECHNICAL FIELD

The present invention relates to a liquid blow molding device for liquid blow molding a resin preform into a container of a predetermined shape.

BACKGROUND ART

Resin containers, represented by polypropylene (PP) bottles or polyethylene terephthalate (PET) bottles, are used for accommodating various liquids such as beverages, cosmetics, chemicals, detergents, shampoos and other toiletries, and the like. Such containers are commonly produced by biaxial stretch blow molding of preforms formed in a bottomed tube shape by resin material.

As for blow molding devices which perform biaxial stretch blow molding, a liquid blow molding device that supplies pressurized liquid to inside of a preform while stretching the preform in the axial direction with the stretch rod to perform liquid blow molding is known (for example, see Japanese Unexamined Patent Application Publication No. 2014-128911). According to such a liquid blow molding device, by using a liquid content which is ultimately stored in the container as a product, such as a beverage or the like, as the liquid to be supplied to the preform, the process of filling the container with the liquid content is omitted, and it is possible to simplify the production process and the configuration of the blow molding apparatus.

SUMMARY OF THE INVENTION

However, with a conventional liquid blow molding device, while the preform is being stretched in the axial direction by the stretching rod, because the pressurized liquid is suddenly supplied into the preform so as to stretch the preform in the radial direction, the preform is suddenly stretched and there was a problem in that there is a risk of the preform rupturing while blow molding.

In view of the foregoing, in one aspect of the present invention provided is a liquid blow molding device that can perform biaxial stretch blow molding without rupturing the preform.

In order to achieve above, in the case where the resin preform is stretched in the axial direction by the stretch rod while pressurized liquid is supplied and the preform is molded into a container of a predetermined shape by liquid blow molding, various changes to the volume of liquid supplied from the pressurized liquid supply to the inside of the preform until the stretching of the preform by the stretch rod is complete were evaluated. From that evaluation, an understanding was gained that if the volume of liquid supplied from the pressurized liquid supply to the inside of the preform until the stretching of the preform by the stretch rod is complete is made to be less than 50% of the volume of liquid to be filled into the inside of the container after liquid blow molding, biaxial stretch blow molding can be confidently performed without rupturing the preform.

That is, a liquid blow molding device according to the principles of the present invention is a liquid blow molding device for liquid blow molding a resin preform into a container of a predetermined shape, comprising: a mold for blow forming in which the preform is disposed; a stretch rod that stretches the preform disposed in the mold in the axial direction; and a pressurized liquid supply for supplying pressurized liquid to the preform disposed in the mold; wherein the liquid blow molding device operates such that a volume of liquid supplied from the pressurized liquid supply to the interior of the preform until the stretching of the preform by the stretch rod is complete is less than or equal to 50% of the volume of liquid to be filled into the interior of the container after completion of liquid blow molding.

It is preferable for the liquid blow molding device of the present invention in the above configuration to operate such that the volume of liquid supplied from the pressurized liquid supply to the interior of the preform until the stretching of the preform by the stretch rod is complete is less than or equal to 40% the volume of liquid to be filled into the interior of the container after liquid blow molding.

It is preferable for the liquid blow molding device of the present invention in the above configuration for the preform to be made of polypropylene, and the liquid blow molding device to operate such that the volume of liquid supplied from the pressurized liquid supply to the interior of the preform until the stretching of the preform by the stretch rod is complete is less than or equal to 37% of the volume of liquid to be filled into the interior of the container after liquid blow molding.

For the liquid blow molding device of the present invention in the above configuration, it is preferable for the preform to be made of polyethylene terephthalate, and the liquid blow molding device to operate such that the volume of liquid supplied from the pressurized liquid supply to the interior of the preform until the stretching of the preform by the stretch rod is complete is less than or equal to 23% the volume of liquid to be filled into the interior of the container after liquid blow molding.

For the liquid blow molding device of the present invention in the above configuration, it is preferable that before the starting of the liquid supply from the pressurized liquid supply to the interior of the preform, stretching of the preform by the stretch rod is started.

According to another aspect of the present invention, by making various changes to the volume of liquid supplied from the pressurized liquid supply to the inside of the preform until the stretching of the preform by the stretch rod is complete, and based on the results on the formability thereof, the volume of liquid supplied from the pressurized liquid supply to the interior of the preform until the stretching of the preform by the stretch rod is complete is made to be less than or equal to 50% of the volume of liquid to be filled into the interior of the container after completion of liquid blow molding, thereby allowing the preform to be reasonably stretched by both the pressurized liquid and the stretching rod, and preventing rupturing of the preform during liquid blow molding.

Therefore, it is possible to provide a liquid blow molding device that can confidently perform biaxial stretch liquid blow molding without rupturing the preform.

DETAILED DESCRIPTION

The principles of the present invention are more specifically described below with examples, and with reference to the drawings.

Figure 1:
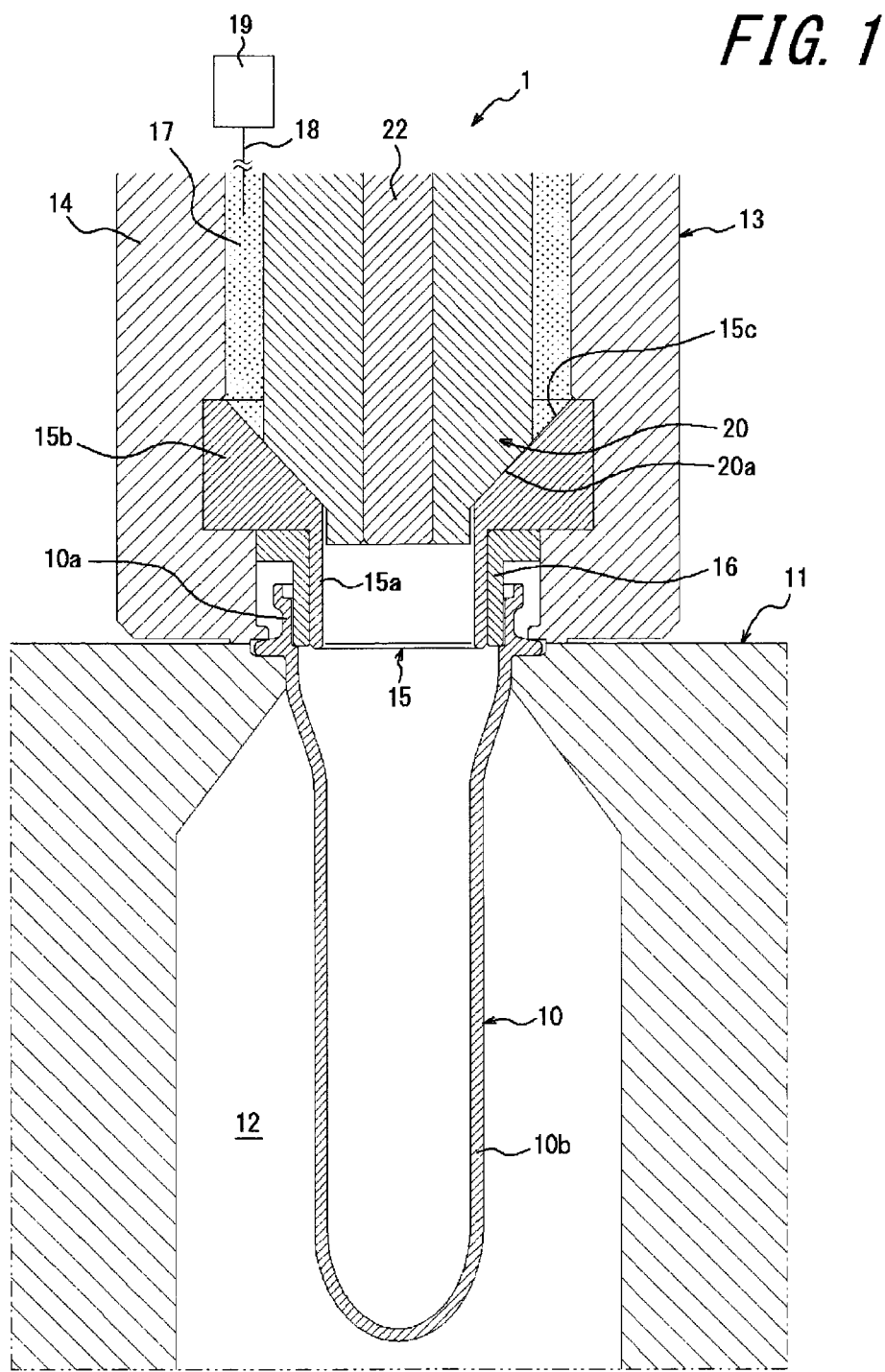
FIG. 1 is a cross-sectional drawing illustrating an enlarged view of a portion of a liquid blow molding device according to one embodiment of the present invention, in a state before initiating liquid blow molding.

In one embodiment incorporating the principles of the present invention, a liquid blow molding device 1 is provided to liquid blow mold a preform 10 into a container of a predetermined shape and has a mold 11 for blow molding. In FIG. 1, only a portion of the mold is illustrated. However, a cavity 12 of the mold 11 is bottle shaped, and opens upward on the top surface of the mold. While details are not illustrated in the drawings, the mold 11 has been made to be able to open on the left and right, so that by opening the mold 11, a product can be taken out from the mold 11 after molding.

The preform 10 is disposed in the mold 11, and is liquid blow molded and formed into a container by the liquid blow molding device 1.

As for the preform 10, a resin material that has stretchability when heated, such as, for example, polypropylene (PP) or polyethylene terephthalate (PET), is formed by injection molding, compression molding, extrusion molding or the like, into a substantially test-tube shape provided with a mouth part 10*a* and a main body part 10*b*. This kind of preform 10 is disposed in the mold 11 in an upright orientation where the mouth part 10*a* protrudes above the cavity 12 of the mold.

Note that the preform 10 is not limited to a single layer structure formed with only one type of resin material. Rather, the preform 10 can also be a laminated structure where an outer layer and an inner layer are formed of different materials and stacked so as not adhere to each other, or a laminated structure where an adhesive layer is provided in the axial direction in a band shape between the outer layer and the inner layer in the laminated structure. When the preform 10 has a laminated structure, this preform 10 can be formed in the predetermined shape by the liquid blow molding device 1 as a delamination container or non-delamination container. As for the delamination container, an inside layer is laminated to the inside of the outside layer and is peelable apart therefrom.

A nozzle unit 13 is provided on the upper side of the mold 11 and is moveable in the vertical direction relative to the mold 11. A nozzle unit 13 has a main body block 14 and nozzle 15.

A nozzle 15 has a configuration such that a nozzle main body 15*a* formed in a cylinder shape of smaller diameter than the inner diameter of the mouth part 10*a* of the preform 10, and a holding part 15*b* having a large diameter formed integrally with the nozzle main body 15*a*, are formed integrally of, for example, a steel material, a resin material, or the like, and the holding part 15*b* is fixed to the main body block 14 by being fixed to an inner surface of a main body block 14.

The nozzle main body 15*a* is disposed coaxially with the cavity 12 of the mold 11, and when the nozzle unit 13 is lowered to the predetermined position, the nozzle main body 15*a* is inserted into the mouth part 10*a* of the preform 10 mounted on mold 11. A seal member 16 seals between the nozzle main body 15*a* and the inner surface of the mouth part 10*a*.

A supply route 17 is provided in the interior of the main body block 14 extending in a vertical direction, and the lower end of the supply route 17 is connected to the nozzle 15.

In addition, a pressurized liquid supply 19 is connected to the supply path 17 via a pipe 18. The pressurized liquid supply 19 can supply pressurized liquid into the preform 10 disposed in the mold 11 at a predetermined pressure via the pipe 18, the supply path 17, and the nozzle 15.

While it is preferable to use a configuration that uses, for example, a plunger pump as a pressure source for the pressurized liquid supply 19, as long as pressurized liquid can be supplied at a predetermined pressure to the inside of the preform 10, other configurations and means can also be used.

An opening and closing body 20 is disposed in the interior of the supply path 17 for opening and closing the nozzle 15. The opening and closing body 20 is formed in a cylindrical rod shape extending along the center axis of the supply path 17 and is movable in the vertical direction on the inside of the supply path 17. Meanwhile, the top surface of the holding part 15*b* of the nozzle 15 is a tapered closing face 15*c*. When the opening and closing body 20 moves to the downward end of its stroke and the tapered face 20*a* provided on the tip of the opening and closing body 20 contacts the closing face 15*c*, the communication between the supply route 17 and the nozzle main body 15*a* is cut off by the opening and closing body 20 so that the nozzle 15 is closed.

In other words, the nozzle main body 15*a* is inserted into the mouth part 10*a* of the preform 10, and in a state of the pressurized liquid supply 19 being in operation, the nozzle 15 is opened by the opening and closing body 20, the pressurized liquid supply 19 supplies pressurized liquid through the nozzle 15 to the inside of the preform 10, and the preform 10 can be liquid blow molded.

A stretch rod 22 is mounted slideably on the inside of the opening and closing body 20. The stretch rod 22 is movable in the vertical direction (axial direction) relative to the opening and closing body 20, and by moving the stretch rod 22 downward (toward the bottom of the cavity 12) relative to the opening and closing body 20, the stretch rod 22 pushes the bottom part of the main body part 10*b* of the preform 10 disposed in the mold 11, allowing the main body part 10*b* to be stretched in the axial direction (vertical direction) in the interior of the cavity 12. In other words, the liquid blow molding device 1 performs biaxial stretch blow molding by supplying pressurized liquid to the interior of the preform 10 in the mold 11 and by vertically stretching the preform 10 in the mold 11 using the stretch rod 22.

Figure 2:
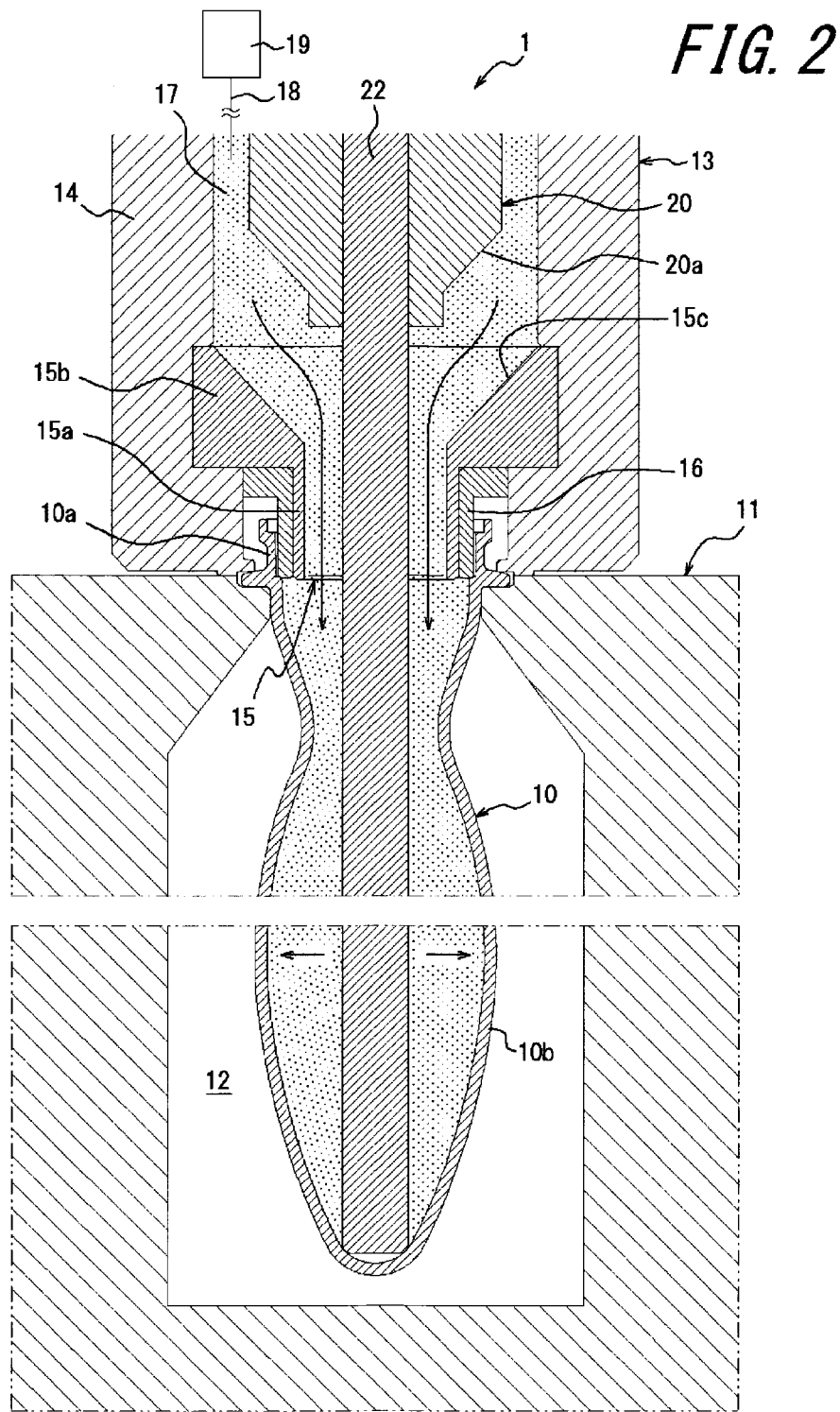
FIG. 2 is a cross-sectional drawing of the liquid blow molding device illustrated in FIG. 1, in a state of the stretch rod having completed stretching the preform.

The stretching of the preform 10 by the stretch rod 22 is complete when the stretch rod 22 reaches the lower end of the stroke of the stretch rod 22, as illustrated in FIG. 2. The lower end of the stroke f the stretch rod 22 is preferably set at a position where the lower end of the main body part 10*b* of the preform 10 that has been stretched by the stretch rod 22 is in contact with the bottom of the cavity 12 of the mold 11 or at a position close to the bottom of the cavity of the mold 11.

Note that the operation, operation timing, and the like of the stretch rod 22, the pressurized liquid supply 19, and the opening and closing body 20 are integratedly controlled by a control device, not shown.

As described above, the liquid blow molding device 1 stretches the preform 10 mounted in the mold 11 in the axial direction with the stretch rod 22 while supplying pressurized liquid from the pressurized liquid supply 19 into the interior of the preform 10 to perform biaxial stretch blow molding; however, it has been found that, for this kind of biaxial stretch blow molding, the volume of liquid supplied from the pressurized liquid supply to the interior of the preform before the stretching of the preform by the stretch rod is complete affects the formability of the preform. Further, as a result of making changes to the volume of liquid supplied from the pressurized liquid supply to the interior of the preform until the stretching of the preform by the stretch rod is complete, it has been determined that if the volume of liquid supplied from the pressurized liquid supply to the interior of the preform until the stretching of the preform by the stretch rod is complete is reduced to less than or equal to 50% of the total volume of liquid to be filled into the interior of the container after liquid blow molding, biaxial stretch blow molding with liquid can be confidently performed without rupturing the preform.

Here, for the liquid blow molding device 1 of the present invention, at the point in time the stretching of preform 10 by the stretch rod 22 is complete, the operation of the stretch rod 22, the pressurized liquid supply 19, and the opening and closing body 20 is controlled so that the volume of liquid supplied from the pressurized liquid supply 19 to the inside of preform 10 is less than or equal to 50% of the volume of liquid to be filled into the container after completion of liquid blow molding. In other words, until the stretching of the preform 10 by the stretch rod 22 is completed, the liquid blow molding device 1 does not supply more than 50% of the volume of liquid that is to be filled into the container after molding. By reducing the volume of liquid, until the stretching of the preform 10 in the axial direction by the stretch rod 22 is completed, the stretching of the preform 10 in the radial direction by the supplying of the pressurized liquid is kept to a suitable stretching amount, preventing rupturing of the preform 10 as a result of sudden stretching.

As described above, in order to prevent ruptures of the preform 10, by the point in time that the stretching of the preform 10 by the stretch rod 22 is complete, the volume of liquid supplied to the inside of the preform 10 by the pressured liquid supply 19 is to be less than or equal to 50% of the liquid volume that will be filled into the interior of the molded container after completion of liquid blow molding, but is preferably less than or equal to 40% of the liquid volume that will be filled into the interior of the molded container after completion of liquid blow molding.

In particular, when the preform 10 is made of polypropylene, at the point in time when stretching of the preform 10 by the stretch rod 22 is completed, it is preferable for the volume of liquid to be supplied from the pressurized liquid supply 19 to the interior of the preform 10 to be less than or equal to 37% of the liquid volume to be filled into the interior of the molded container after completion of liquid blow molding. As a result, biaxial stretch blow molding can confidently be done without rupturing the preform 10 when using a preform 10 made of polypropylene.

In addition, when the preform 10 is made of polyethylene terephthalate, at the point in time when stretching of the preform 10 by the stretch rod 22 is completed, it is preferable for the volume of liquid to be supplied from the pressurized liquid supply 19 to the interior of the preform 10 to be less than 23% of the liquid volume to be filled into the interior of the molded container after completion of liquid blow molding. As a result, biaxial stretch blow molding can competently be done without rupturing the preform when using a preform 10 made of polyethylene terephthalate.

At the point in time when the stretching of the preform 10 by the stretch rod 22 is completed, in order to make the volume of liquid to be supplied from the pressurized liquid supply 19 to the inside of the preform 10 less than 50% of the liquid volume to be filled into the interior of the molded container after completion of liquid blow molding, it is preferable to start the stretching of the preform 10 by the stretch rod 22 before starting the supply of liquid to the inside of preform 10. That is, it is preferable to start the operation of the stretch rod 22 before the nozzle 15 is opened by the opening and closing body 20.

Through such a configuration, since the stretch rod 22 causes the preform 10 to stretch by a certain degree in the axial direction and then pressurized liquid is supplied from the pressurized liquid supply 19 to the interior of the preform 10, even if liquid is supplied to the inside of the preform 10 with high pressure and flow rate appropriate for liquid blow molding, at the point in time when the stretching of the preform 10 by the stretch rod 22 is complete, the volume of liquid to be supplied from the pressurized liquid supply 19 to the inside of the preform 10 can be suppressed to less than or equal to 50% of the liquid volume which will be filled inside the molded container after completion of liquid blow molding. Therefore, the preform 10 can be efficiently and accurately liquid-blow molded by liquid of high pressure and flow rate suitable for liquid blow molding while confidently preventing rupture due to suddenly stretching the preform 10.

Next, in order to confirm the effect of the present invention, in one example a bottle-shaped container with 360 mL content volume, and overall height 172 mm is liquid blow molded from a polypropylene (Prime Polymer Co. J246 M) preform weighing 9 g, in another example a bottle-shaped container with 660 mL content volume and overall height 205 mm is liquid blow molded from a polypropylene (Prime Polymer Co. J246 M) preform having a weight of 20 g, and a third example wherein a bottle-shaped container with 660 mL content volume and overall height 205 mm is liquid blow molded from a polyethylene terephthalate (SA 135, Mitsui Chemicals, Inc.) preform having a weight of 20 g, liquid blow molding was performed with various changes made to the amount of liquid supplied to the interior of the preform from the pressurized liquid supply until the stretching of the preform by the stretch rod completed, and the formability thereof was evaluated. Note that the temperature of the preform during the liquid blow molding was 135° C. for the preform made of polypropylene and 120° C. for the preform made from polyethylene terephthalate.

Figure 3:
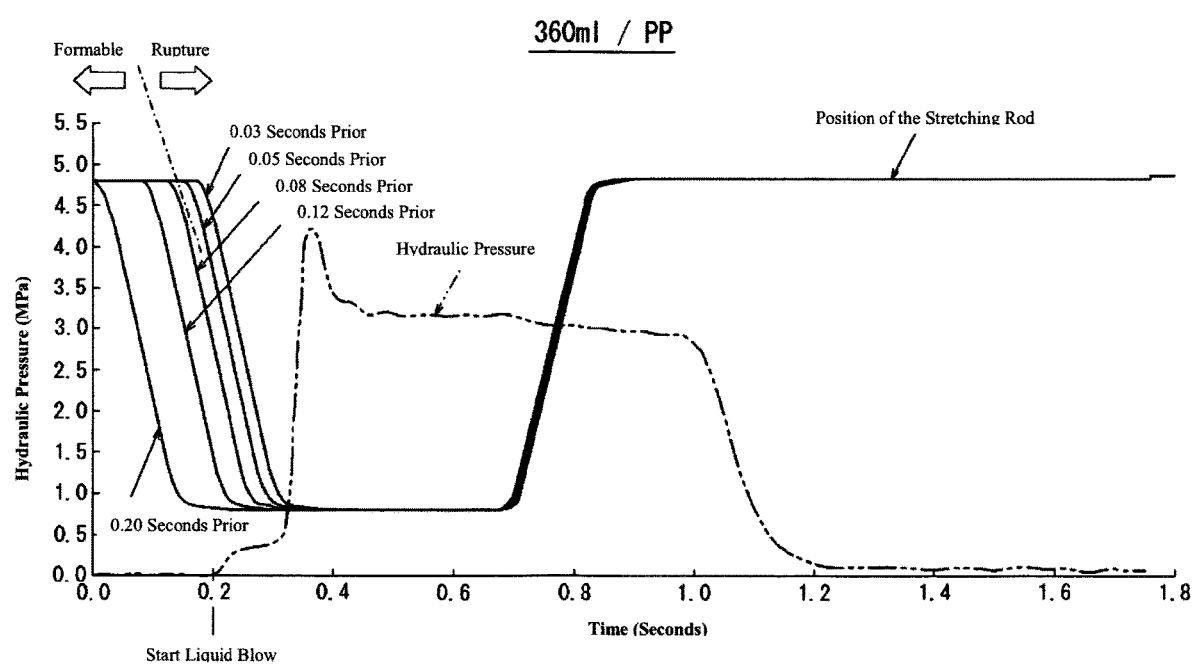
FIG. 3 is a timing chart diagram illustrating the operation timing of the stretch rod and the opening and closing body together with the hydraulic pressure in the preform when liquid blow molding a bottle-shaped container having an internal volume of 360 ml from a polypropylene preform.

The change in the volume of liquid supplied from the pressurized liquid supply to the inside of the preform until the stretching of the preform by the stretch rod is complete was performed by making various changes to the actuation (operation) start timing of the stretching rod, with the timing that the opening and closing body is opened, that is, the start of liquid blow, as the reference. That is, in the example of liquid blow molding a container with a content volume of 360 mL from a preform made, for example, of polypropylene, as shown in FIG. 3, by changing the actuation timing of the stretch rod to 0.20 seconds prior, 0.12 seconds prior, 0.08 seconds prior, 0.05 seconds prior, and 0.03 seconds prior to when the liquid blow is started, the amount of liquid supplied to the interior of the preform from the pressurized liquid supply until the stretching of the preform by the stretch rod completes was changed. Similarly, in the example of liquid blow molding a 660 mL content volume bottle-shaped container made of a polypropylene preform, the operation timing of the stretch rod was changed to 0.20 seconds prior, 0.15 seconds prior, 0.15 seconds prior, 0.10 seconds prior, 0.08 seconds prior, and 0.05 seconds prior to when the liquid blow is started, and in the example where a 660 mL content volume bottle-shaped container is made by liquid blow molding a preform made from polyethylene terephthalate, the operation timing of the Stretch rod was set to 0.20 seconds prior, 0.15 seconds prior, 0.10 seconds prior, 0.08 seconds prior, and 0.05 seconds prior to when the liquid blow is started, thereby changing the amount of liquid supplied to the interior of the preform from the pressurized liquid supply until the stretching of the preform by the stretch rod completes.

Table 1 shows the evaluation results for the example of a liquid blow molded bottle-shaped container having a volume of 360 mL from a preform of made of polypropylene, Table 2 shows the evaluation results for the example of liquid blow molded bottle-shaped container having a volume of 660 mL from a preform of made of polypropylene, and Table 3 shows the evaluation results for the example of a liquid blow molded bottle-shaped container having a volume of 660 mL from a preform of made of polyethylene terephthalate.

From the results of Table 1 to 3, if the volume of liquid supplied from the pressurized liquid supply to the inside of the preform until the stretching of the preform by the stretch rod is complete, in other words, the liquid volume upon completion of stretching V2, is made to be less than 50% of the volume of liquid to be filled into the inside of the container after liquid blow molding, in other words, the liquid volume after molding V1, it is confirmed that liquid blow molding can be done without rupturing the preform. In addition, it is confirmed that it is preferable to have the liquid volume upon completion of stretching V2 be less than 40% of the liquid volume after molding V1.

In addition, from the results of Table 1 and Table 2, in the example of a preform made of polypropylene, if the liquid volume upon completion of stretching V2 is made to be less than 37% of the liquid volume after molding V1, it is confirmed that liquid blow molding can be confidently done without rupturing the preform.

TABLE 1

| Stretch Rod Actuation Timing | 0.20 seconds prior to starting liquid blow | 0.12 seconds prior to starting liquid blow | 0.08 seconds prior to starting liquid blow | 0.05 seconds prior to starting liquid blow | 0.03 seconds prior to starting liquid blow |
|---|---|---|---|---|---|
| Liquid Volume after Molding V1 (ml) | 374.7 | 375.3 | 376.2 | — | — |
| Liquid Volume upon Completion of Stretching V2 (ml) | 45.6 | 87.8 | 136.6 | — | — |
| (V2/V1) × 100 (%) | 12.2 | 23.4 | 36.3 | — | — |
| Formability | ○ | ○ | ○ | rupture | rupture |

TABLE 2

| Stretch Rod Actuation Timing | 0.20 seconds prior to starting liquid blow | 0.15 seconds prior to starting liquid blow | 0.10 seconds prior to starting liquid blow | 0.08 seconds prior to starting liquid blow | 0.05 seconds prior to starting liquid blow |
|---|---|---|---|---|---|
| Liquid Volume after Molding V1 (ml) | 666.8 | 666.8 | 671.9 | 669.1 | — |
| Liquid Volume upon Completion of Stretching V2 (ml) | 63.7 | 134.4 | 178.6 | 227.6 | — |
| (V2/V1) × 100 (%) | 9.6 | 20.1 | 26.6 | 34 | — |
| Formability | ○ | ○ | ○ | ○ | rupture |

TABLE 3

| Stretch Rod Actuation Timing | 0.20 seconds prior to starting liquid blow | 0.15 seconds prior to starting liquid blow | 0.10 seconds prior to starting liquid blow | 0.08 seconds prior to starting liquid blow | 0.05 seconds prior to starting liquid blow |
|---|---|---|---|---|---|
| Liquid Volume after Molding V1 (ml) | 696.9 | 694.1 | 693.8 | 694.9 | — |
| Liquid Volume upon Completion of Stretching V2 (ml) | 34.5 | 88.0 | 159.3 | 249.5 | — |
| (V2/V1) × 100 (%) | 5.0 | 12.7 | 23.0 | 35.9 | — |
| Formability | ○ | ○ | ○ | About half rupture | rupture |

Further, from the results of Table 3, in the case of a preform made from polyethylene terephthalate, if the liquid volume upon completion of stretching V2 is made to be less than 23% of the liquid volume after molding V1, it is confirmed that liquid blow molding can be confidently done without rupturing the preform.

The present invention is not limited to the embodiment, and various changes are possible within a scope that does not deviate from the intent thereof.

The preform is not limited to being made of polypropylene or made from polyethylene terephthalate; preforms of other materials can also be used.

What is claimed is:

1. A liquid blow molding device for liquid blow molding a resin preform into a container of a predetermined shape, the device comprising:
   a mold having a cavity in which the preform is to be disposed;
   a stretch rod configured to stretch the preform disposed in the mold in the axial direction; a pressurized liquid supply configured to supply pressurized liquid to the preform disposed in the mold; and
   a controller configured to limit, prior to completion of axial stretching of the preform by the stretch rod, a volume of liquid supplied from the pressurized liquid supply to an interior of the preform to an amount greater than 0% and less than or equal to 50% of a total volume of liquid to be filled into an interior of the container after completion of liquid blow molding.

2. The liquid blow molding device according to claim 1, wherein the controller is configured to limit, prior to completion of axial stretching of the preform by the stretch rod, the volume of liquid supplied from the pressurized liquid supply to the interior of the preform to less than or equal to 40% the total volume of liquid to be filled into the interior of the container after liquid blow molding.

3. The liquid blow molding device according to claim 1, wherein:
   the preform is made of polypropylene; and
   the controller is configured to limit, prior to completion of axial stretching of the preform by the stretch rod, the volume of liquid supplied from the pressurized liquid supply to the interior of the preform to less than or equal to 37% of the total volume of liquid to be filled into the interior of the container after liquid blow molding.

4. The liquid blow molding device according to claim 1, wherein:
   the preform is made from polyethylene terephthalate; and
   the controller is configured to limit, prior to completion of axial stretching of the preform by the stretch rod, the volume of liquid supplied from the pressurized liquid supply to the interior of the preform to less than or equal to 23% the total volume of liquid to be filled into the interior of the container after liquid blow molding.

5. The liquid blow molding device according to claim 1, wherein the controller is configured to start stretching of the preform by the stretch rod before starting supplying of pressurized liquid from the pressurized liquid supply to the interior of the preform.

6. A method of liquid blow molding a container of predetermined shape and volume from a preform, the method comprising the steps of:
   providing the preform within a cavity of a mold defining the predetermined shape of the container;
   advancing a stretch rod into an interior of the preform and causing axial stretching of the preform within the cavity of the mold from a start position to a fully extended position where the stretch rod is no longer being advanced;
   supplying a first volume of pressurized liquid into the interior of the preform prior to the stretch rod being in the fully extended position;
   supplying a second volume of pressurized liquid into the interior of the preform after the stretch rod has been extended to the fully extended position, the first volume and the second volume defining a total volume of liquid to be supplied into the predetermined volume of the container; and
   the first volume being limited by a controller configured to limit the first volume to greater than 0% and less than or equal to 50% of the total volume prior to completion of axial stretching of the preform by the stretch rod.

7. The method according to claim 6, wherein the first volume of pressurized liquid is less than or equal to 40% of the total volume.

8. The method according to claim 6, wherein the preform is made of polypropylene and the first volume of pressurized liquid is less than or equal to 37% of the total volume.

9. The method according to claim 6, wherein the preform is made of polyethylene terephthalate and the first volume of pressurized liquid is less than or equal to 23% of the total volume.

10. The method according to claim 6, wherein the step of advancing the stretch rod is started before the step of supplying the first volume of pressurized liquid into the interior of the preform.

11. The liquid blow molding device according to claim 1, wherein the controller is configured to provide, prior to completion of axial stretching of the preform by the stretch rod, the volume of liquid supplied from the pressurized liquid supply to the interior of the preform in an amount greater than or equal to 5% the total volume of liquid to be filled into the interior of the container after liquid blow molding.

* * * * *